US007366694B2

(12) United States Patent
Lazerson

(10) Patent No.: US 7,366,694 B2
(45) Date of Patent: Apr. 29, 2008

(54) CREDIT/FINANCING PROCESS

(75) Inventor: Jeffrey M. Lazerson, Laguna Niguel, CA (US)

(73) Assignee: Mortgage Grader, Inc., Laguna Niguel, CA (US)

(*) Notice: Subject to any disclaimer, the term of this patent is extended or adjusted under 35 U.S.C. 154(b) by 1127 days.

(21) Appl. No.: 10/207,344

(22) Filed: Jul. 29, 2002

(65) Prior Publication Data
US 2003/0036996 A1    Feb. 20, 2003

Related U.S. Application Data

(63) Continuation-in-part of application No. 10/139,418, filed on May 6, 2002.

(60) Provisional application No. 60/312,919, filed on Aug. 16, 2001, provisional application No. 60/327,026, filed on Oct. 3, 2001, provisional application No. 60/362,314, filed on Mar. 5, 2002.

(51) Int. Cl.
*G06Q 40/00* (2006.01)
(52) U.S. Cl. ...................................................... 705/38
(58) Field of Classification Search ................. 705/38, 705/39, 42
See application file for complete search history.

(56) References Cited

U.S. PATENT DOCUMENTS

| 5,930,776 A | 7/1999 | Dykstra et al. |
| 5,940,812 A | 8/1999 | Tengel et al. |
| 5,966,699 A | 10/1999 | Zandi |
| 5,995,947 A | 11/1999 | Fraser et al. |
| 6,014,645 A | 1/2000 | Cunningham |
| 6,029,149 A | 2/2000 | Dykstra et al. |
| 6,088,686 A | 7/2000 | Walker et al. |
| 6,105,007 A | 8/2000 | Norris |
| 6,148,293 A | 11/2000 | King |

(Continued)

OTHER PUBLICATIONS

"LoansDirect Advances Online Lending Technology With the Industry's First 100% Online Mortgage." Business Wire. New York. Feb. 17, 2000. p. 1.*

(Continued)

*Primary Examiner*—Hani M. Kazimi
*Assistant Examiner*—Daniel Kesack
(74) *Attorney, Agent, or Firm*—Knobbe, Martens, Olson & Bear LLP

(57) ABSTRACT

A method for a borrower to obtain and/or evaluate desired financial services is disclosed. Personal information from the borrower is obtained and recorded. The personal information includes reasons that the borrower wants to obtain the financing. Financing evaluation information based on pre-established and objective criteria used by at least one established financial institution that provides financing of the type sought by the borrower is obtained and recorded. A credit grading for the borrower is determined based on the personal information, and the financing evaluation information. The credit grading is determined by an independent entity that will not provide the financing to the borrower. The financing may be a loan, such as a mortgage loan or an auto loan or the financing may be the issuance of a credit card or a line of credit. The independent entity also compiles a comparison of closing costs associated with the financial transactions, and can optionally provide an estimate of those costs for one, and preferably for a variety of providers of the desired financing.

37 Claims, 5 Drawing Sheets

U.S. PATENT DOCUMENTS

| | | | |
|---|---|---|---|
| 6,208,979 | B1 | 3/2001 | Sinclair |
| 6,289,319 | B1 | 9/2001 | Lockwood |
| 6,321,202 | B1 | 11/2001 | Raveis, Jr. .................... 705/1 |
| 6,385,594 | B1 | 5/2002 | Lebda et al. |
| 6,438,526 | B1 | 8/2002 | Dykes et al. |
| 6,470,338 | B1 | 10/2002 | Rizzo et al. |
| 6,505,176 | B2 | 1/2003 | DeFrancesco, Jr. et al. |
| 6,587,841 | B1 | 7/2003 | DeFrancesco et al. |
| 6,611,816 | B2 | 8/2003 | Lebda et al. |
| 6,691,094 | B1 | 2/2004 | Herschkorn |
| 2001/0005829 | A1 | 6/2001 | Raveis, Jr. .................... 705/1 |
| 2001/0037230 | A1 | 11/2001 | Raveis, Jr. et al. ............ 705/9 |
| 2001/0047282 | A1 | 11/2001 | Raveis, Jr. .................... 705/7 |
| 2002/0023051 | A1 | 2/2002 | Kunzle et al. |
| 2002/0049624 | A1 | 4/2002 | Raveis, Jr. .................... 705/8 |
| 2002/0077964 | A1* | 6/2002 | Brody et al. .................. 705/38 |
| 2002/0077970 | A1 | 6/2002 | Lebda et al. |
| 2002/0103789 | A1 | 8/2002 | Turnbull et al. |
| 2003/0208412 | A1* | 11/2003 | Hillestad et al. ............. 705/26 |

OTHER PUBLICATIONS

Sichelman, Lew., "RESPRO trade group forges plan to simplify loan costs." The San Diego Union-Tribune. San Diego, California: Feb. 7, 1999. p. H3.*

Grant E. Mitchell, "Will RESPA Reforms Bring Bundling to Settlement Services?" *Mortgage Banking*, May 2002 issue, p. 87-90.

John Hagel III and Marc Singer, "*Net Worth: Shaping Markets When Customers Make The Rules*," Harvard Business School Press, pp. 10, 13-20, 23-30, 42, 43, 49-52, 112-170, 183-184, 231, 242 (1999).

Seth Godin, "*Permission Marketing-Turning Strangers into Friends, and Friends into Customers*," Simon & Schuster, Chapter Two, pp. 40-52 (1999).

Pierce, R., "*Beneficial National Bank Partners Widely, Pioneers the Web to Deliver Loans*," Journal of Retail Banking Services, vol. XIX, No. 3, pp. 1-5 (1997).

"*E-Business Real-Estate Web Sites, The Web Brings Real-Estate Transactions Home*," Informationweek.com, dated Apr. 10, 2000.

Lamb, E., "*How the Internet affects consumers, banks and business*," Community Banker (Oct. 2000).

Shacklett, M., "*Effective Software Integration is the Key to Making it all Happen*," Credit Union Magazine, pp. 49-53, (Apr. 2001).

Rose, S., Article Summary "*Money, Where to Refi Online*," Time Incorporated, (Dec. 1998).

Kiesnoski, K., *E-Decisioning IBC Creates 'Virtual Loan Committee*,' Community Bank Systems + Technology; Oct. 1999; 36, 10; p. 50.

Office Action issued on Apr. 24, 2007 in U.S. Appl. No. 10/139,418 (the parent of the present application).

Office Action issued on Oct. 3, 2007 in U.S. Appl. No. 10/139,418 (the parent of the present application).

Office Action issued on Aug. 22, 2007 in U.S. Appl. No. 10/139,418 (the parent of the present application).

* cited by examiner

CREDIT/FINANCING PROCESS

CROSS-REFERENCE TO RELATED APPLICATIONS

This application is a continuation-in-part of U.S. patent application Ser. No. 10/139,418 filed May 6, 2002, the entire contents of which are hereby incorporated by reference, which claims the benefit of provisional application No. 60/312,919, filed Aug. 16, 2001, the entire contents of which are hereby incorporated by reference, U.S. provisional application 60/327,026 filed Oct. 3, 2001, the entire contents of which are hereby incorporated by reference, and U.S. provisional application 60/362,314 filed Mar. 5, 2002, the entire contents of which are hereby incorporated by reference.

BACKGROUND OF THE INVENTION

The present invention relates generally to financial transactions including a method for a borrower to evaluate and/or obtain financing, e.g., a loan or a credit card.

Shopping for financing (e.g., a loan, such as a mortgage) can be a complicated time-consuming process. The mortgage industry has been slow to empower borrowers in order to save them time, make their lives easier, and help them determine their best loan options. Because of this, borrowers, and in particular, credit-impaired borrowers, are often overcharged. The Coalition of Responsible Lending has stated that ten million borrowers have been overcharged up-front fees of over $9,000,000,000, which equates to ten million borrowers being overcharged an average of over $900 each. The practice of offering borrowers loans at rates that are higher than warranted by the credit history of the borrower is sometimes referred to as predatory lending. Predatory lending is a very difficult and challenging problem to recognize in practice as many lenders may use procedures that conceal the nature of the predatory practices.

There are newspaper or Internet referral sites which publish interest rates for one or more lenders. However, the user must interact individually with each prospective lender. It is very time consuming for a borrower to investigate each of the potential lenders. Furthermore, each prospective lender typically runs a credit report on the borrower, causing there to be multiple inquiries on the borrower's credit report. The basis for an adverse decision is often unknown.

There is thus a need for a way to help a borrower to avoid predatory lending and paying higher than justified loan rates.

BRIEF SUMMARY OF THE INVENTION

One aspect of the present invention may be regarded as a method for reducing predatory lending when a borrower seeks financing. Personal information is obtained and recorded regarding the reasons that the borrower wants to obtain the financing. Loan evaluation information is obtained and recorded. The loan evaluation information is preferably based on, or the same as the criteria used by at least one established financial institution that may provide financing to the borrower. A credit grading is determined for the borrower based on pre-established and objective criteria, the personal information and the loan evaluation information. The credit grading is performed by an entity that is not loaning money to the borrower.

The financing sought by the borrower may be a loan. The loan may be, for example, a mortgage loan, a personal loan, an auto loan, or a student loan. The financing sought by the buyer may also be a credit card.

The credit grading information may be provided to the borrower so the borrower can use the information to evaluate his financing options, e.g., different loans.

The credit grading information may be provided to at least one financial institution. The financial institution evaluates providing financing to the borrower based on the credit grading information. The credit grading information may be provided to a plurality of financial institutions or to others authorized by the borrower. The information provided by the borrower is preferably, but optionally handled in a confidential manner and not disclosed to others. The credit score or grade is also preferably handled in a confidential manner and is not disclosed unless authorized by the borrower.

BRIEF DESCRIPTION OF THE DRAWINGS

These, as well as other features of the present invention, will become apparent upon reference to the drawings, wherein.

DETAILED DESCRIPTION

An improved way for borrowers to shop for financing (e.g., loans, such as mortgage or auto loans or credit cards) is provided. A person or a group of people (borrower(s)) are interested in receiving financing, such as a mortgage for a home. The mortgage could be a purchase, refinance or cash-out refinance home loan. It could be first, second or third mortgage lien. For purposes of illustration herein, a mortgage will be used in illustrating and describing the present invention. However, it will be appreciated that the loan can be another type of loan, such as an auto loan, a personal loan, a student loan, etc. or that the financing may not be a loan at all, but may be directed to obtaining a credit card or arranging other types of financial credit, for example, a line of credit.

A series of questions are asked of the borrower in order to correlate the most appropriate financing with the borrower's desires. Credit and financial information is also acquired from the borrower. That information is compared with financing qualification criteria and/or credit qualifying criteria in order to provide a borrower with an impartial credit evaluation or loan evaluation based on the submitted information. That credit evaluation or loan evaluation can be used as a check against commercial lenders offering loans to the borrower to allow the borrower to compare against the loan rate or credit rating offered to the borrower by lenders in order to ensure the borrower receives the most desirable loan based on the credit available to that borrower.

Figure 1:
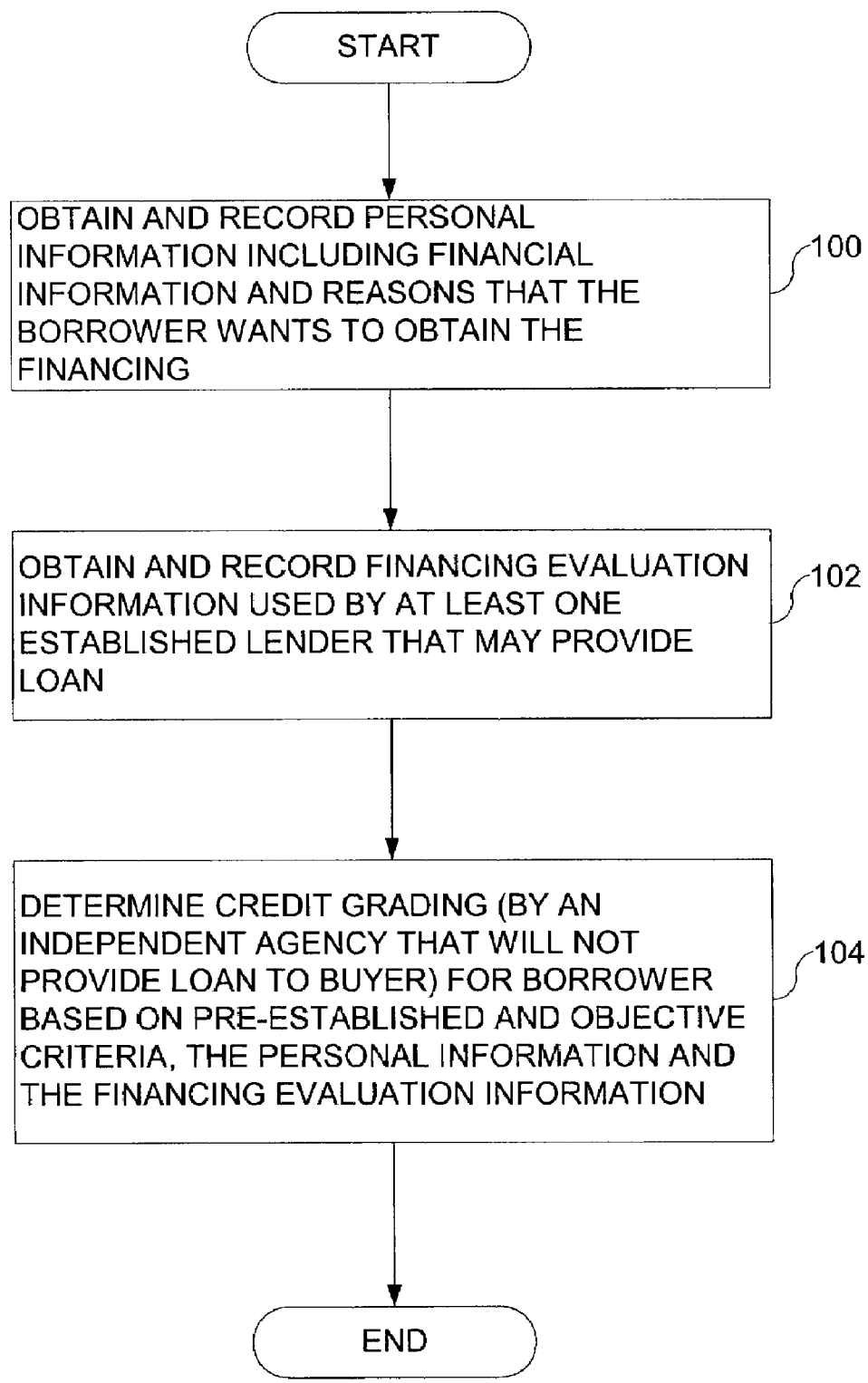
FIG. 1 is a flow diagram illustrating an exemplary method for a user to obtain financing in accordance with the present invention.
Figure 2A:
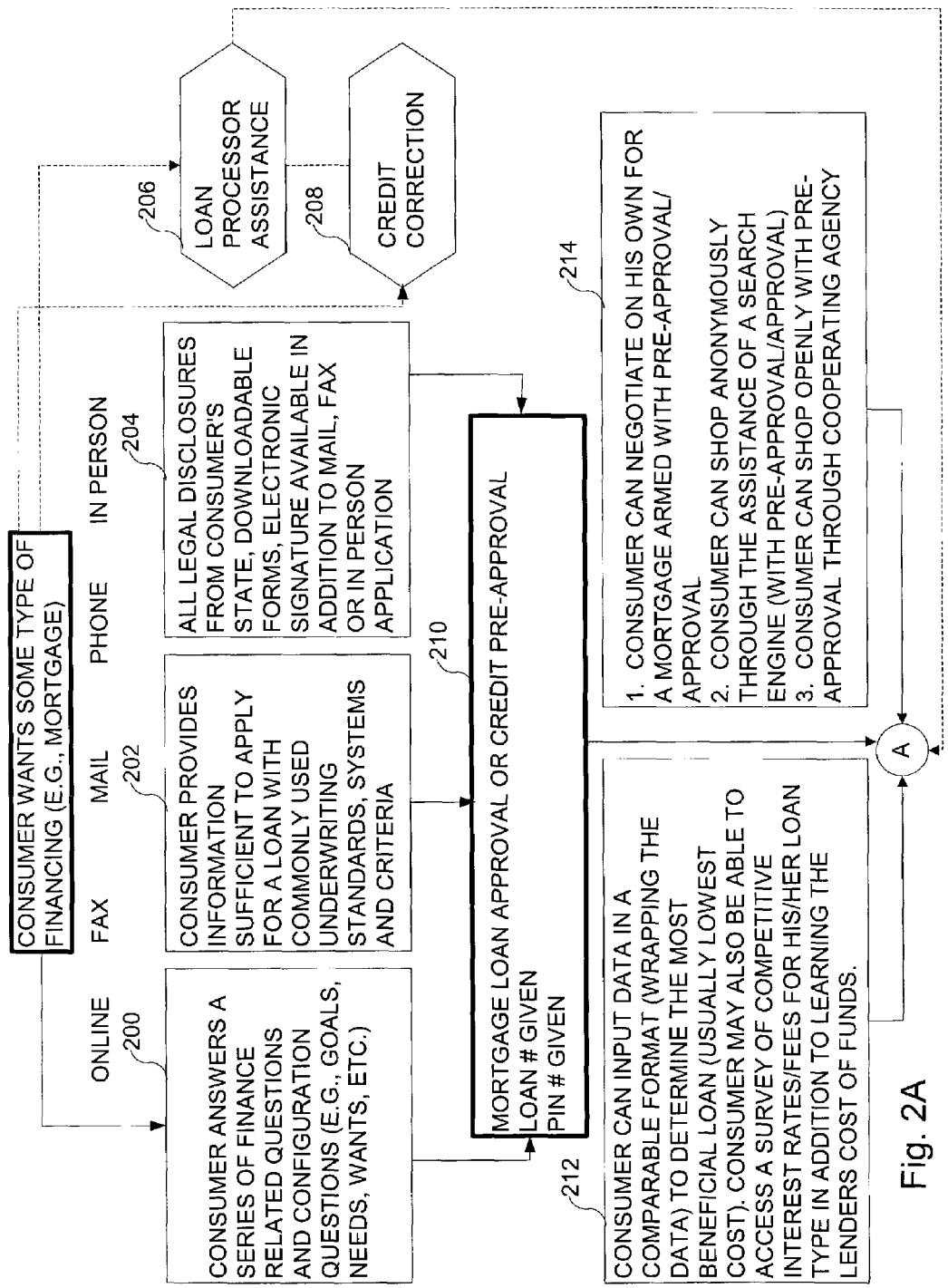
FIGS. 2A-2B shows a block diagram illustrating further detail of various aspects of the method illustrated in FIG. 1.
Figure 2B:
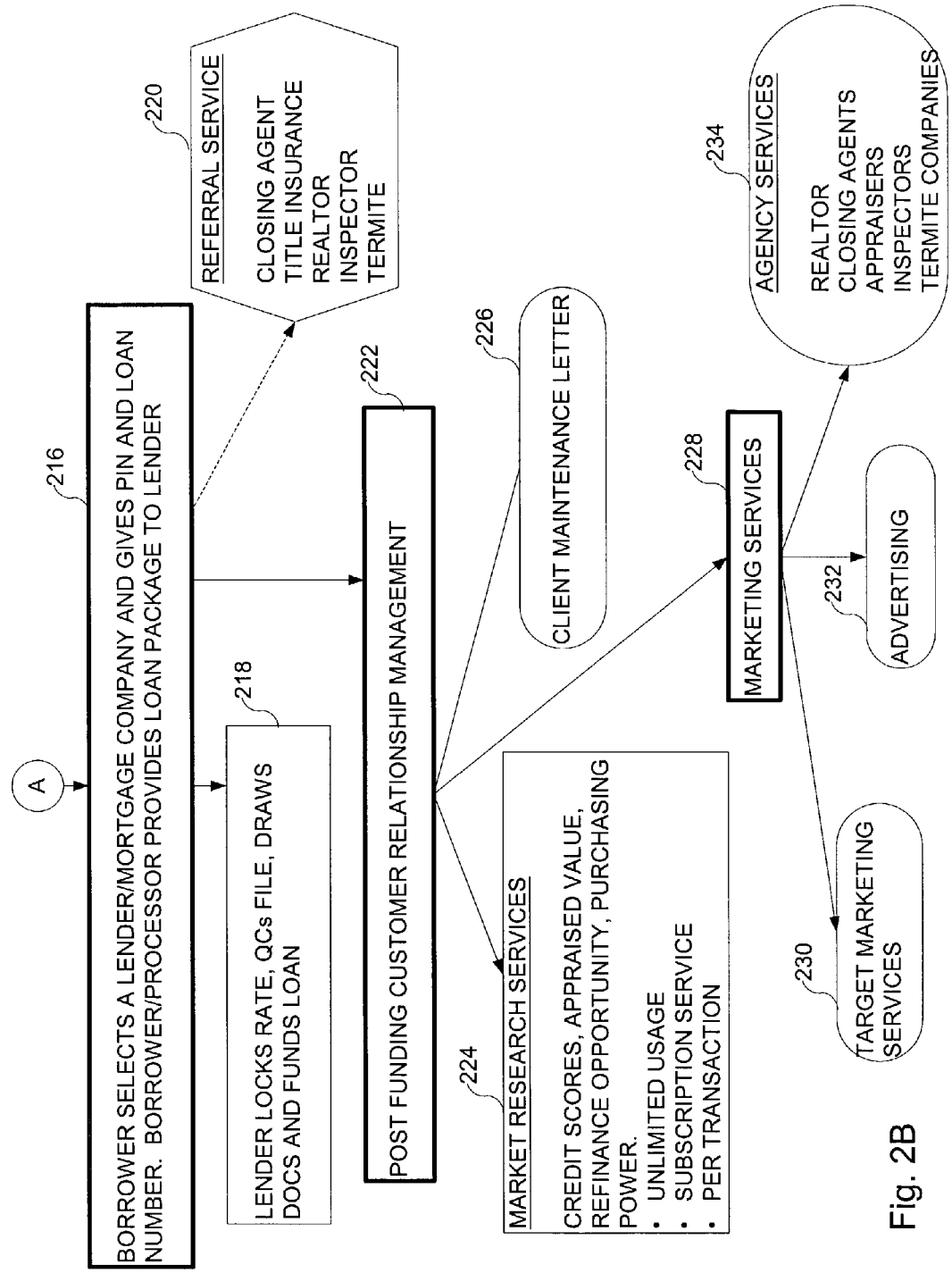

Referring now to the drawings wherein the showings are for purposes of illustrating preferred embodiments of the present invention only, and not for purposes of limiting the same, FIG. 1 is a flow diagram illustrating an exemplary method for obtaining a mortgage. FIGS. 2A-2B are a block diagram illustrating in further detail various aspect of the method illustrated in FIG. 1.

The logic of FIG. 1 moves from a start block to block 100 where the user is asked a series of questions, either verbally, or visually, for example, in a written format. In exemplary embodiments, this process is performed over the Internet by viewing questions on a computer display and sending responsive information. The responsive information may be sent over the Internet, e.g., by filling out and submitting the information in an online form, via attached documents, via scanned documents, etc. It will be appreciated that the user could also answer the question in person, over the phone, via facsimile, via postal mail, etc. In more detail, as shown in block 200 of FIG. 2A, the borrower(s) answer a series of configurative questions. These questions relate to goals, needs, wants, etc. of the borrower. The precise questions will vary but are directed toward achieving one or more specific purposes. These questions are optional, but are preferred. The purpose of these questions is twofold. First, the questions allow the potential borrower(s) to focus on exactly what the borrower(s) is/are trying to accomplish. For example, the primary interest might be to obtain funds to purchase real or personal property, to improve monthly cash flow, to reduce payment, to obtain a different type of loan, to alter the monthly loan amount or other terms of the loan, or to refinance and obtain various amounts of cash. Second, the questions make clear to the loan processor and/or eventual lender exactly what the borrower(s) objectives are in seeking the financing so the most appropriate types of loans and terms can be offered to the borrower(s).

Prior to finalizing a loan amount, various items, especially some or all of the items typically involved in calculating closing costs can be verified with the borrower(s) to be certain that the loan being put in place is the loan most suitable to what the borrower(s) wants. As with the prior questions, these questions can be answered over the phone, on-line, through the mail, by fax, in person, etc. Illustrative closing cost items include but are not limited to, one or more of points and fees being charged, type of loan product (conventional loans, jumbo loans, conforming loans, F.H.A., V.A., etc.), lien position, purpose of loan, etc. A more complete illustration is provided regarding the alternative embodiment of FIGS. 3-4.

The logic of FIG. 1 proceeds to block 102 where financial evaluation information is obtained and recorded from at least one financial institution from which the borrower may obtain the loan, financing, credit, etc.

In addition to providing the information from the configurative questions, the borrower(s) provide information sufficient to apply for a loan. This may alternatively comprise actually applying for a loan or financing independently and separately from any person or entity that is a mortgage credit grantor or mortgage arranger (block 202). This application can be done over the phone, on-line or with a live customer service representative assisting the telephone applicant(s). It can also be done through the mail, in person, by fax, or through a global communications system, such as the Internet.

The loan application can also be done with the assistance of a loan processing service that helps answer questions of the borrower, acquire information, and generally assist the borrower in the application process (block 206). There may or may not be a fee charged for this application portion of the service. Loan processors can help explain to potential lenders various aspects of the borrowers credit history that may appear undesirable. They may help consolidate prior loans, to remove or explain adverse credit ratings, or claims, and make the borrower's credit appear more desirable. Some of these aspect involve credit correction which is discussed in further detail later. While the assistance of a third party can be used in the loan application process, the borrower(s) may attempt to apply on his own. The information from this loan application is provided to the same entity having the responses to the configurative questions.

Often, the borrower(s) may be aware of something that needs to be corrected or questioned regarding the credit report of the individual borrower or borrower. The borrower(s) may be aware of this before or become aware of this during the mortgage application process. The borrower could go directly to a credit correction company or be referred by the loan processor to a credit correction company (block 208). There may or may not be a fee charged for this service. The information given to any credit correction company is preferably, but optionally, provided to the same entity that has the responses to the configurative questions.

The purpose of the credit correction is to resolve anything having an adverse effect on the consumer's credit and that is typically achieved by removing incorrect information, closing accounts that the borrower sees no useful purpose in keeping open, negotiating settlements of amounts owed to creditors as well as negotiating the reduction or removal of negative items on the credit report. The credit correction could also coordinate among creditors and the three major credit bureaus (Experian, Transunion and Equifax) to correctly portray outstanding balances, public records items, tax liens, judgments, collections, charge-offs and, in conjunction with Fair Isaac's Company (FICO), all to improve the credit scores of the borrower. Any results of the credit correction are preferably, but optionally, provided to the same entity that has the responses to the configurative questions, especially if the results alter the credit worthiness of the borrower.

The logic then moves to block 104 where a credit grade or score is determined. In conjunction with the previously answered configurative questions, the borrower's mortgage or other financial application will be evaluated based upon objective, pre-set underwriting criteria. One or more, and preferably all, of the credit history, credit score(s), equity, down payment, income, assets, job history and stability could be considered. The criteria need not be inclusive of all lender's criteria. The mortgage credit evaluation system is preferably based upon commonly used industry evaluation systems, including one or more of Fannie Mae, Freddie Mac, F.H.A., V.A., Ginnie Mae, private mortgage insurance companies, or combinations of those evaluation systems. It could also be based upon individual lender's evaluation systems if those are different from the above-mentioned systems. For example, Washington Mutual Bank has significant market share in the United States. The institution may have its own evaluation process, possibly not commonly used within the industry. The results of the evaluation are based on objective, pre-set underwriting criteria provided to the borrower. In exemplary embodiments of the invention, the borrower is provided with his or her credit report and credit grades or scores. The borrower could also be provided with an electronic appraisal of the property. This information could be provided to the borrower via the Internet or via another method, such as via facsimile or mail.

For other types of financing, other financial criteria will apply. For example, a bank's criteria for a credit card, for a line of credit. The criteria is preferably that criteria used by a recognized institution providing the financing desired by the borrower, and the criteria will vary with the institution and the type of criteria involved.

The purpose of would-be borrower(s) knowing independently of any interested mortgage credit grantor or arranger is for the borrower(s) to independently know their borrowing strength and ability. If the borrower(s) know that they have an excellent grade in the mortgage credit granting system, they are armed with valuable information that can help them to negotiate the most favorable terms, e.g., interest rates. See block 212 of FIG. 2A. This may also allow the borrower(s) to receive a better loan suited to their particular needs, preferably, but optionally, as indicated by the borrower's responses to the personal configurative questions. This may not necessarily mean the most favorable interest rate. For example, while a borrower may be able to get 90% cash-out, it may be more valuable to the borrower to get only 80% cash-out. The 90% cash-out will probably carry a less favorable interest rate or more points, or both.

The would-be borrower preferably receives a credit pre-approval from the entity having the responses to the configurative questions and the other above identified information. Alternatively, the would-be borrower receives a full loan approval from the entity having the responses to the configurative questions and the other above identified information. The difference between these two alternatives is that the pre-approval gives a loan amount and loan terms that the borrower is currently eligible for. The actual loan approval means that the borrower(s) have everything in place; a specific property, specific interest rate and loan amount, appraisal, title report, escrow/attorney (closing agent), paperwork, proof of income, assets (if needed), for that particular loan program, and any other required paperwork that might be needed to complete the transaction. The borrower(s) is/are issued a loan number and personal identification (PIN) number.

The approval or pre-approval will be good (locked) for a certain number of days. The number of days will vary based on a variety of circumstances. A loan number is preferably, but optionally, issued in conjunction with commonly used underwriting standards, systems, and criteria. For example, FANNIE MAE might issue a loan number. That loan number could be the loan number issued for the borrower(s) credit pre-approval or loan approval. A personal identification number (PIN) can be used for privacy protection. Preferably, but optionally, the borrower(s), through their PIN number, control who can look at their file. Thus, preferably the borrower's credit information can be owned or controlled by the borrower. No one has access to the borrower's identity or information without the borrower releasing the information. Even when submitting credit information and the other information discussed herein to a lender, the borrower(s) can submit, at least preliminarily, the information to the lender or mortgage broker using a PIN number and thus maintain further confidentiality.

One purpose of the lender not knowing the exact identity of the borrower(s), at least initially, is to protect the time invested by the borrower(s) in responding to sales calls that might result from releasing the identity of the borrower(s). It also protects the borrower(s) privacy, the confidentiality of the information involved, and security of the borrower(s) until the borrower(s) actually decides and chooses who the lender or mortgage broker will be to perform the loan origination task. By maintaining the identity of the borrower(s) in confidence or even in secret through a PIN number, it is possible to force lenders to at least initially evaluate potential borrower(s) on objective criteria, and that can reduce profiling, discrimination, predatory lending, subjective selection to achieve other undesirable and unlawful goals that might arise if the borrower(s) identity were known.

One purpose for the lender or mortgage broker using this intermediary is to ideally offer the guaranteed interest rate and closing costs to those borrowers that are loan approval capable. Lenders/mortgage brokers do not have to guarantee interest rates up front. This process will assist mortgage originators by not having to log in and guarantee interest rates to borrowers that cannot qualify for that lender's/mortage broker's loan approval criteria.

Using this approval or pre-approval information, the borrower(s) can shop on their own. The borrower(s) can shop anonymously through a computerized search engine. Or, the borrower(s) can shop openly with the assistance of a cooperating agency. See block 214.

The borrower(s) may be able to access current interest rate and fee surveys of lender/mortgage companies to compare that information with what the applicant is being quoted by others. See block 212. The borrower(s) may also be able to find out how much the lender/mortgage company is paying for the money being loaned to the borrower or used to provide other financial services to the borrower or applicant. This is similar to finding out what a car dealer pays the manufacturer for the car. Additionally, the mortgage applicant(s) or borrower(s) can analyze the data in a comparable format (wrapping the data). This can help to determine the most beneficial loan or other financial arrangement. This usually, but not always means, the lowest interest rate, the lowest credit rate, any balloon payments, etc. that meets the applicant's personal requirements. But the wrapped data that is presented in a format to allow comparison, such as a spreadsheet format, advantageously includes the term (duration) of the mortgage(s), loan or financial commitment; interest rate, the annual percentage rate (APR), note rate (which could be different than the start rate or the interest rate), loan amount, total closing costs, total summation of category/provider costs (i.e., mortgage broker, lender, closing agent, title etc.), interest rate; the interest rate adjustment period(s); future interest rate(s), if known (i.e., fixed rate buydowns or graduated payment mortgages), starting interest rate, lifetime cap or maximum rate, margin, index, guaranteed interest rate lock period, prepayment penalty term and dollar amount of penalty, index history, description of index, and other related information. The wrapped data also preferably, but optionally, includes the borrower's credit risk scoring or credit rating as determined by various institutions, including industry ratings such as FICO (Fair Isaacs & Co.), and private ratings from lending institutions and/or mortgage insurance companies. As discussed below, in a further embodiment the independent third party can present the wrapped data to the borrower(s), with the wrapped data being provided free, as part of the services of the third party, or for a fixed or variable fee.

After receiving the credit report, loan approval or loan pre-approval, the borrower can go to negotiate a loan on his or her own behalf with any mortgage originator(s) that may financially benefit by packaging and/or funding the borrower's loan. See block 214. The borrower authorizes the mortgage originator to pull-up the approval findings using the pre-approval/approval authorization number. The mortgage originator negotiates a rate and fees for the borrower to be charged, knowing that the loan is already pre-approved and in the belief that the information inputted from the loan application is accurate. The mortgage originator will likely make any mortgage or financing subject to verification of information inputted from the loan application. The rate and fees charged are typically based upon the credit grading of the approval.

With authorization from the borrower, the mortgage originator then collects the information needed from the loan approval findings. The borrower(s) is/are simply handing over the package of required items that the pre-approval/approval has specified. See block 216. The lender formally examines the loan file. The lender locks in interest rate. Upon satisfactory receipt of accurate and valid information (quality control), the file is formally lender approved. The loan documents are drawn. The borrower(s) sign the loan documents. The loan is funded. See block 218. Other types of financial assistance will have different processes that vary with the nature of the transactions involved, such as a credit card, line of credit, etc.

The information compiled by the entity having the answers to the configurative questions can also be used for goods or services related to the purpose for which the borrower is obtaining financing or for helping the borrower obtain such goods or services. See block 220. Thus, the borrower(s) may also need other industry services. Some examples are a closing agent, title company, real estate agent, home inspector, termite company and utility hook-up, all of which are related to a home purchase. A system and method for identifying third party vendors for goods and services related to real estate transactions is disclosed in U.S. Pat. No. 6,321,202, the complete contents of which are incorporated by reference herein. The borrower(s) could find those needed services through this credit granting system, by having the entity with the answers to the configurative questions provide the information to the borrower, or provide the identity of the borrower to providers of the appropriate goods or services. It will be appreciated that these related services are dependent upon and vary with the type of loan or financing being obtained by the borrower. For example, in the case of an auto loan, related services might include auto security devices, etc. There may or may not be a charge for providing contact information for these needed goods and/or services.

After the borrower(s) go through the credit granting process, they may or may not have actually had a loan funded. Within this mortgage credit granting system, there is opportunity for providing future reminders or information on the borrowers' credit report and credit scores, property value, interest rates, borrowing power, etc. The borrower(s) may wish to access information about his/their own property (ies), credit, borrowing power, etc. This could be done by paying or not paying a fee for unlimited usage, periodically sent to borrower(s) (subscription service) or on a per transaction basis. See block 224.

Additionally, the borrower(s) may periodically receive informational bulletins for the purpose of maintaining a relationship between the borrower and the entity having the answers to the configurative questions. See block 226. This could be communicated by fax, Internet, e-mail, delivered mail or by phone, or other communication devices now existing or developed in the future.

The borrower could also access marketing services by giving permission to receive advertising, be contacted about a specific product or service related to home ownership. The borrower could also initiate communication with a related product or service (Agency Service) that can be accessed as part of this credit granting system. There may or may not be a fee charged for this service whether it is the borrower of vendor.

This above method is not designed to be used to actually negotiate mortgages. It could be used to do this, but preferably, it is designed to give the borrower information about their credit grading. The credit grading includes a grading based on combinations of a variety of factors, including various combinations of a credit report for the borrower, borrower income, borrower assets, borrower liabilities, property appraisal, title report, and whatever criteria a particular lender deems appropriate. If borrowers know that they are acceptable based on commonly used credit-granting standards/systems/criteria (e.g., Fannie Mae, Freddie Mac, F.H.A., V.A., etc.) that typically offer the lowest rates and fees, it makes them less vulnerable to be victimized by predatory lenders and/or mortgage originators that charge unreasonably high rates and fees to a good quality borrower. Similarly, this process allows an applicant to evaluate an aspect of their finances based on accepted criteria used in the trade for the particular financial aspect in question, and enables the applicant to use the resulting information to the advantage of the applicant Borrower privacy is preferably, but optionally, an important critical component to this credit granting system. Preferably, no entity gains access to the borrowers' information without the clear consent of the borrower. Any entity that receives business through this system (e.g., loan processor, credit correction company) is thus preferably contractually obligated to maintain the borrower's privacy. Likewise, affiliated entities having access to borrower information are preferably precluded by agreement from releasing information about that borrower unless the borrower gives permission to do so. Preferably, the information may only be released as specifically instructed by the borrower(s).

There is thus advantageously provided a method by which an applicant seeking financing can provide information to a third party evaluator that will render an independent evaluation of the applicant for the requested financing based on objective criteria used by at least one established entity that can provide the financing sought by the applicant. The applicant can then use that independent evaluation for his/her/its own purposes. Preferably, the applicant will use the evaluation to obtain the desired financing, to negotiate more favorable terms on the financing, or to guard against terms less favorable than are believed to be otherwise available to a person having the independent evaluation.

More preferably, the applicant also provides information relating to the reasons for seeking the financing. That information is preferably, but optionally used by the third party evaluator to select criteria more applicable to the desires of the applicant, or to direct the applicant to financial institutions more likely to suit the applicant's needs or the applicant's desires, or to allow a financial institution to evaluate the applicant's financial requests, or any combination of these. Further, this information can be provided to third party providers who can provide goods or services to the applicant which goods or services are related to the use to which the applicant intends to put the financing.

There is thus provided a method by which a third party can acquire information from an applicant and compare the information with predetermined criteria and provide an evaluation relating to a financial matter. The evaluation can be used to avoid predatory lending, is preferably used to obtain financing in the form of financial assistance to the applicant, and is more preferably used to obtain a financial loan, and is still more preferably used to obtain home mortgage financing. In the mortgage context, the service will preferably provide persons seeking mortgages with information about the amount of money they should be able to borrow based upon current rates. By establishing appropriate arrangements between the third party evaluator and the person providing the mortgage or other financial service, a pre-approval could even be granted by the third party, such as a mortgage pre-approval. Such pre-approval would be subject to the later agreement by the lender or provider of other financial services after verification of the information provided by the borrower or other person seeking financial services.

The method described herein is advantageously implemented by inputting the information from the applicant into a computer, into an electronic device, or into another device which compares at least some of the information to predetermined criteria used by an established entity, be it a person, business or organization, that provides financial services of the type sought or needed by the applicant. Preferably, the criteria is stored in memory and the applicable criteria is selected by the computer automatically or by a person manually, based in part upon personal information provided by the applicant as to the reasons for requesting the financial service. Advantageously, the evaluation also includes specifics on the financial services desired, such as appropriate fee and interest rate ranges based on the loan amount and loan program for a home loan mortgage. A tentative pre-approval can also be provided by the third party evaluator subject to verification of the accuracy of the information provided by the person seeking the financial services.

Advantageously the criteria for providing the requested financial service (e.g., mortgage) is obtained from several providers, preferably the major providers of the desired financial service (e.g., Freddie Mac, Fannie Mae, FHA, VHA, etc). The disclosure and use of the financial criteria will typically be confidential between the third party evaluator and the provider of the desired services. Moreover, the disclosure of the financial criteria preferably includes computer software allowing automated application of the criteria by the third party evaluator. If access to the actual criteria used by providers of the desired service is not available, then in appropriate circumstances software or criteria closely mimicking the desired service provider's criteria can be used. For example, in the home mortgage area if Freddie Mac loan criteria is not available, then loan criteria from Countrywide could be used.

Advantageously, but optionally, the configuration information is also provided to the third party evaluator, and that information is used to help select the financial service providers most likely to provide the service desired. The computer database that is preferably, but optionally used to assist in the evaluation is desirably programed to narrow the financial sources based on the requirements of the person seeking the financial services.

The comparison results in an evaluation that is preferably printed or provided in other tangible form or in a form visually perceptible by the applicant, as for example, a visual display on a computer screen or video monitor. Advantageously, the person seeking the financial services will be provided with an evaluation from the major suppliers of the desired financial services. For example, a credit rating from the three major providers (Experian, Transunion, Equifax) could be provided.

The method described herein can advantageously be used online, with the person seeking financial services filling out his or her own application and transmitting the information over the Internet. The third party evaluator will receive the information and use a computer to search for the requestor's best options based upon the information provided by the requester and based upon the requestor's specific needs or special requests as identified by the configuration questions. The third party evaluation, in the home loan context, advantageously provides credit reports and scores, loan approval findings and an AVM (automated valuation model) if there is a specific property in question.

Because the requester (the person seeking the financial services) owns all of the personal information provided to the third party evaluator, and because the information is provided over secured lines and methods of transmittal, the information is confidential and preferably will not be released without permission from the requester. This differs from many, if not all, of the current home loan situations in which the lender owns the application (and thus the information on the application) for a home loan. Indeed, having the lender own the credit information is required by law in order to regulate lenders and inhibit fraud committed by lenders upon borrowers seeking home loans.

The requestor/borrower can then shop for a loan anonymously through any of a variety ways. Once the requestor/borrower finds an acceptable choice, the third party sends the evaluation and some or all of the financial information obtained from the requester and some or all of the configuration information, to the provider selected by the requester. This allows the confidential information to be sent only to the person or persons specifically identified by the requestor/borrower. This contrasts significantly with current Internet based loan systems in which financial information is simultaneously submitted to a plurality of predesignated, potential lenders in the hope that one of them will offer to make a loan after internally evaluating the loan request.

Upon receipt of the third party evaluation, the requestor/borrower may also decide to wait and attempt to improve the credit rating or evaluation. Credit problems can be cleared up, debt can be consolidated, etc. Because the evaluation is confidential, there is no adverse report to later hinder the requestor/borrower and there are fewer credit checks showing up on the requestor's credit. There are disadvantages to having a large number of credit checks on a person's credit.

The present method envisions that the person seeking the financial services will incur a legal obligation to pay, and will actually pay the third party for rendering an independent evaluation based on objective criteria. The payment by the person seeking the service is different than reimbursing appraisal fees or the costs of credit reports, and constitutes payment for services rendered. The payment is preferably an out-of-pocket payment by cash, check, money order, credit card etc.

But the payment can in some circumstances be made by the person providing the financial services. An example would be when the third party provides the person seeking the desired financial services with the identification of one or more providers of the desired financial services and the person desiring the financial services actually obtains the services from the provider. In that case, a preexisting arrangement may exist under which the person providing the financial services pays for the evaluation by the third party, gives a financial credit to the person seeking the service, or provides a separate payment to the third party. Moreover, the person providing the financial services may pay the third party evaluator for referring the person seeking the financial services. Because the third party is preferably independent, these payments from the providers are transfers between separate legal entities that have no ownership affiliation, and they must comply with regulatory disclosure requirements. Despite the existence of such financial reimbursements for providing leads to lenders or to other service providers, the third party evaluators are still considered independent. If the third party evaluator is a full time employee of an entity providing the desired financial services or if the third party evaluator receives a percentage commission from an affiliated company based on the loans funded through this program, then the third party would most likely not be considered independent. Either an independent third party, or an affiliated/interested third party could be used, but the affiliated/interested third party is less desirable.

The above description is given in the context of an individual obtaining financial services, using a home loan as an example. The method provided herein is equally applicable to any person, when person is understood to mean any human, as well as any legal entity such as a corporation, partnership, limited liability company, etc.

Figure 3:
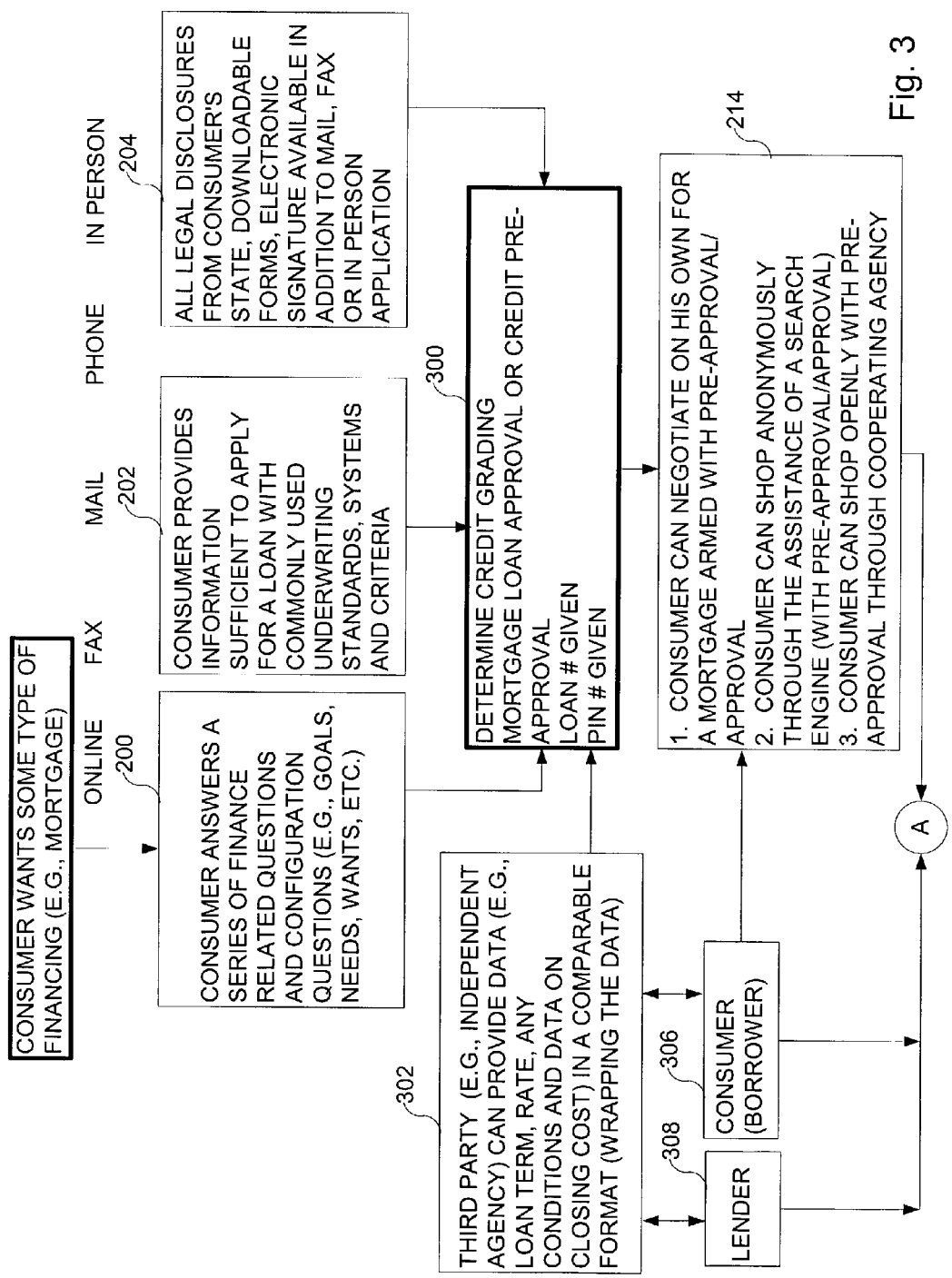
FIG. 3 is a flow diagram illustrating an exemplary method for a user to obtain financing in accordance with the present invention.

A further embodiment of this invention is illustrated in FIG. 3. Blocks with the same numbers as blocks in FIGS. 2A and 2B (e.g. block numbers less than 300) are the same as described regarding FIGS. 2A and 2B, above unless noted otherwise, so their descriptions are not repeated. Block 300 performs same functions as former block 210 and everything previously described relative to block 210 applies to block 300. But block 300 also includes the data acquisition step of block 302. As reflected by block 302, additional information is acquired, preferably, but not necessarily by an independent agency. The acquired information preferably involves wrapped data on the loan term, rate and any conditions, as well as wrapped data on closing costs. The wrapped data of block 302 is advantageously provided by the same party that performs the functions of block 300, but two separate parties could be used for the functions of each block.

The wrapped data is advantageously, but optionally, presented in a format to allow comparison, such as a spreadsheet format. The wrapped data on the loan term, rate and conditions advantageously includes the term (duration) of the mortgage(s), loan or financial commitment; the interest rate; the interest rate adjustment period(s); future interest rate(s) if known (i.e., fixed rate buydowns or graduated payment mortgages), starting interest rate, lifetime cap or maximum rate, margin, index, guaranteed interest rate lock period, prepayment penalty term and dollar amount of penalty, index history, description of index, and other related information. Advantageously, some or all of these loan aspects, especially the rate and lifecap, are guaranteed unless an observable and verifiable index or other appropriate data or means s a change in interest rates.

The wrapped data on the closing costs will vary with the nature of the financial transaction involved, but for a home loan include such information associated with title, and these fees include Title Insurance, title insurance endorsements, title insurance premiums/fees, title surveys, messenger fees and reconveyance fees, title insurance fees. There are also a number of charges associated with the closing agents, and these include, but are not limited to, closing agent escrow officer fees, attorney fees, title company closing agent/officer charges, notary fees, recording fees, messenger fees, payoff demand fee(s), facsimile fees, prepaid interest for a certain number of days in the month of the closing.

There are additional charges associated with loan origination fees, and these include, but are not limited to loan origination fees or loan points, discount points, mortgage broker points/fees, processing fees, credit report charges, credit report updating charges, credit report correction fees and costs, underwriting fees, loan document fees, tax services, wire transfer charges, flood zone certification costs, recording fees, automated computer appraisal charges, human on-site appraisal fees, drive-by appraisals, automated computer appraisals, property hazard/fire insurance costs for a specified amount of time, mortgage insurance for a specified time period and/or until the mortgage is paid down to a certain loan to value or until there is a certain amount of increased property value through appreciation or through a combination of both, biweekly or other note modification set-up fees, interest rate note modification, term of note modification, relocking at the same or different interest rate or renewal of rate lock guarantee under a different loan than the original guaranteed loan program, home warranty policy fees, termite inspection fee and termite report charges, roof inspection fees, geological inspection report fee, mold, contamination, natural hazards inspection fee and report charges, mortgage life insurance, disability insurance, mortgage unemployment insurance costs.

There are additional fees associated with real estate agencies, and these include but are not limited to real estate agent commissions, administrative fees for home buyers, home sellers or both. Selling costs may include all tile insurance and closing agent related fees. Mortgage broker. Further, there may be fees associated with mortgage brokers, and these fees include but are not limited to fees associated with a borrower agreement for mortgage broker to receive a specified amount of the lender rebate, and any yield spread premium or service release premium in lieu of or in addition to the mortgage broker directly charges points or fees to the borrower for arranging the loan. Finally, there may be extraneous, but nonetheless appropriate charges, such as fees associated with the independent third party's efforts, charges for the configuration questions, charges for transmitting, verifying, and guaranteeing some level of accuracy of the information and costs quoted by the third party. As always seems to be the case, there are probably some unexpected fees.

To the extent some of the above are referred to as fees or charges when they should be costs, or vice versa, they all represent money charged to and paid by the borrower(s) and may generally be referred to as fees, or costs or charges. The wrapped information is preferably presented in the above groupings, but various combinations of itemizations can be used, depending on the financial transaction involved and fees associated therewith. Moreover, there may be conditions associated with some or all of the above fees, and advantageously, but optionally, those conditions are also are enumerated for comparison. Further, it is desirable, but optional, to include a total sum of the associated costs for a bottom-line comparison.

This wrapped data is preferably compiled based on information from one or more agencies providing the services. These fees from the various providers may be based on standard fees, or the independent third party may reach agreements with one or more providers for a fee reduction for any of a variety of reasons, including volume discounts.

Advantageously, but optionally, the various above itemized costs associated with the wrapped information, or at least the total cost, is guaranteed or locked-in to be the fee maximum charged for a fixed period of time, such as 30 days, but the time can vary. Preferably from the third party's viewpoint, the costs of some or all of the wrapped data are guaranteed but within a predetermined variance rate, such as 5%, preferably 10%, and more preferably 15%. That permissible variance may apply to some or all of the wrapped data, but is more likely to apply to only some specific items, such as for example, per diem interest, hazard insurance, and escrow impounds. This guarantee of costs is preferably provided by the third party. This guarantee of costs allows the borrower(s) to comparatively evaluate the advantages of using various entities in the wrapped data to provide the loan.

Alternatively, the wrapped data relating to costs or rates or combinations thereof can be presented in the form of a good faith estimate. Such good faith estimates preferably, include the wrapped cost data with the interest rate and preferably the terms associated therewith being guaranteed for a predetermined time. In a further alternative, various aspects of the loan terms are guaranteed unless an observable and verifiable index or other appropriate data or means warrants a change in interest rates. All of this wrapped data is preferably included in block 302.

This wrapped data is preferably provided to the borrower by the independent third party so the borrower(s) can comparatively evaluate which lender to use, and to evaluate and more accurately predict the fixed costs associated with the financial transaction. The usefulness of the wrapped data to the borrower is enhanced if the wrapped cost data is provided for a plurality of lenders or mortgage brokers or providers of the various services. This wrapped data is preferably compiled in a computer, and forms a data structure of comparative cost information for one or more businesses providing the various services needed. The information can be provided in a printed format, or transmitted electronically to the borrower(s) or other appropriate entities by other means now known or developed in the future.

Some or all of this wrapped data of block 302 can also be provided to either the borrower via block 306 or to the lender or provider of the financial services sought by the borrower (s) as in block 308. Such information can be provide to the lender as in block 308 without confidential restriction and thus disclosing confidential information about the borrower (s) to the lender. Alternatively, only the borrower(s) PIN number, or minimal information on the borrower(s) may be disclosed for the reasons discussed above regarding block 210 in FIG. 2A. The use of PIN numbers or other identifying indicia associating a borrower with a credit evaluation and optionally with a guaranteed cost quotation, allows the borrower to shop anonymously and compare lenders or other providers of the desired financial services. Advantageously, the information, guarantees such as rate locks and cost locks for fixed time periods, is all done by computer so the borrower(s) do not have to leave the privacy of their residence.

Referring to block 308, that block can represent receipt by one or more lender or provider of the desired financial services sought by the borrower. That block can also represent mortgage brokers in a home loan situation. The lender or broker can accept a registration number or PIN number instead of specific borrower identifying information in order to guarantee an interest rate and optionally but preferably to also guarantee closing costs (as discussed above regarding block 302) for a specified number of days. Such guarantee is preferably, but optionally, subject to validation of all required loan approval documentation and information at a later date. Various ranges of borrower information can be provided from none (via the PIN number), to the borrower's name, to full identity of the borrower and the borrower credit, to the responses to the configuration questions, or any combinations thereof. In order to provide the most useful information to the user, current information from lenders is needed and information from the borrower relative to the amount of loan and desired loan terms is needed, thus information is transmitted both to and from the lender (block 308) and the consumer (block 306), as reflected by the arrows in FIG. 3. Because some of the information from the lender and consumer overlaps with the information provided relative to block 300, it is preferable, but not necessary, to have the functions of blocks 300 and 302 performed by the same entity.

This process allows the borrower to shop several lenders without disclosing the borrower's identity, yet allows the lender confidence that the borrower qualifies for the loan. This process is especially useful to the borrower if the credit grading of block 300 includes data from a variety of lenders, and if the cost wrapping of block includes data from a variety of lenders and other service providers.

In the sequence of FIG. 3, the third party providing the services of block 300 is preferably an independent third party, as defined above. Alternatively, the party providing the services of block 300 may provide a mortgage. Such a third party packager advantageously signs an agreement to provide a package that includes a loan at a specified rate and term, thus locking in the loan rate and terms. The closing costs of block 302 may or may not also be locked-in. A lender preferably also signs the agreement or ratifies the agreement after the borrower accepts the terms, with the lender agreeing to provide the loan. The lender agrees only subject to underwriting approval and appraisal etc., or other verifications of information appropriate to the financial transaction involved. As the mortgage is provided by or arranged by the third party, the third party providing some or all of the services of block 300 could lock in the loan rate and terms. Optionally, but preferably, the third party could also lock some or all of the costs as discussed regarding block 302, with or without the variations on some or all of the costs as discussed regarding block 302. Such third parties could optionally guarantee a specified loan rate with a guaranteed price for all settlement costs, which could be attractive to borrowers if the loan rate is low as the closing costs are predictable, and in fact are guaranteed.

Preferably, but optionally, the third party packager of block 300 is an independent third party that merely provides credit gradings, answers to configuration questions, or buyer pre-qualifications to the lenders or other mortgage brokers or other packagers as described in the immediately preceding paragraph, and that provides the various functions described relative to block 300.

The embodiment shown in FIG. 3, may also include any or all of the functionality shown in FIG. 2B as indicated by connector A.

As discussed below, in a further embodiment the independent third party can present the wrapped data to the borrower(s), with the wrapped data being provided free, as part of the services of the third party, or for a fixed or variable fee.

Figure 4:
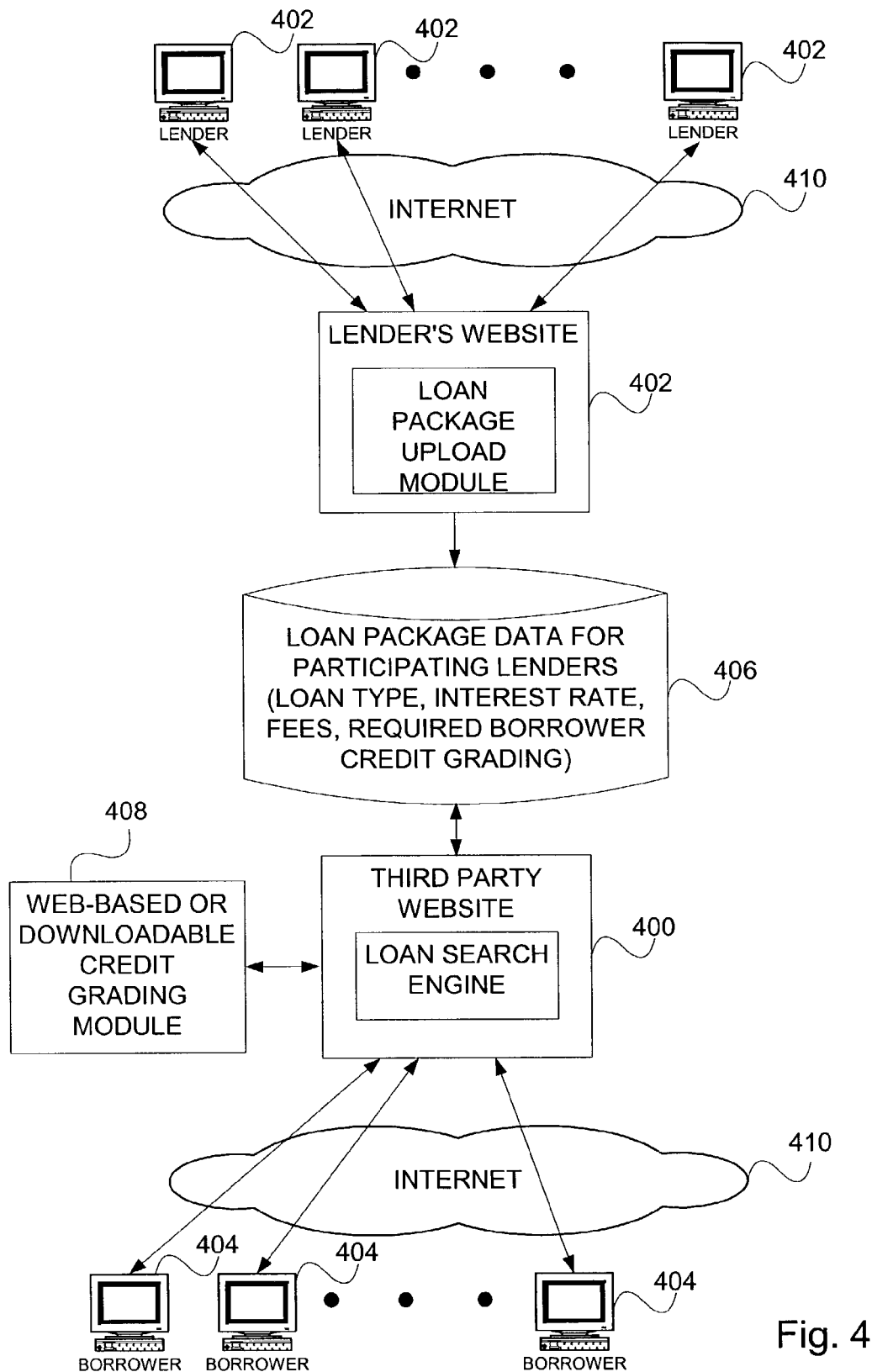
FIG. 4 is a block diagram illustrating a computer and database arrangement to implement the features described herein.

Referring to FIG. 4, a diagram is shown that illustrates one way in which the various steps described above can be achieved using a computer system that is preferably a distributed system. The independent third party has a computer accessible site 400 that is preferably accessible through the Internet 410, or through other data transfer means now known or developed in the future. The lender(s) each also preferably have a computer accessible site 402 that is preferably accessible through the Internet 410, or through other data transfer means now known or developed in the future, with some of the currently known communication means being discussed above. One or more borrowers, or their representatives optionally, but preferably also each have a computer accessible site 404 associated with each individual borrower or borrower representative, with the site 404 being preferably accessible through the Internet 410, or through other data transfer means now known or developed in the future, with some of the currently known communication means being discussed above.

The site 404 provides a user interface using web pages which facilitate the user in providing information to and receiving information from the third party website 400. For example, the borrower can set up an account which includes a PIN number for accessing the site. Web pages including forms for the borrower to enter information, such as the purpose of the loan, borrower's income information, etc. are provided to the borrower via the borrower site 404. After applicable loan programs have been determined by the user, the loan program data can be uploaded to the borrower computer and be displayed via the borrower web site 404. The borrower is able to compare the various loan packages without exposing personal information to any of the lenders. Preferably, but optionally, the loan package information is displayed in a spread sheet type format.

The third party site 400 has or has access to a database 406 that is preferably, but optionally accessible through a web site or through other data transfer means now known or developed in the future, with some of the currently known communication means being discussed above.

The database 406 preferably contains a data structure comprising a searchable database of information provided or compiled in response to one or more of blocks 100, 102, 302 and 220. Rather than have all information consolidated in a single database, plural databases can be used, either partitioned within a single structure or distributed spatially. Preferably, database 406 contains information from lenders supplied in response to blocks 100 and/or 102, and contains cost data supplied in response to block 302 and/or 220.

Access to the database is preferably controlled by the third party, especially regarding loan provider criteria of block 102 and cost data of block 302, although in appropriate circumstances the lender(s) or service providers whose data is contained in the database 406 may have direct access to their own information in order to update the information. Preferably only the third party extracts information from the database 406 through a search engine that may be located with the database 406 or on the third party's web site 400 in the event that the database 406 and the equipment operating the web site 400 are spatially separated such as being in different geographic locations.

The third party's site 400 also preferably has access to or contains a credit grading module 408 to allow the third party to analyze information, such as evaluating borrower input from block 100 and/or 102 relative to the lender requirements in database 406 or with the cost data from block 302 and/or 220. This searching and analysis is advantageously achieved through a loan search engine that is preferably at site 400, but that could be located elsewhere and accessible from the site 400. Thus, the credit grading module 408 is advantageously executed by a server associated with web site 400 running a loan search engine that compares borrower information with lender criteria and loan and closing cost information. The exact nature of the information analyzed will vary with the nature of the financial transaction involved. Alternatively, the module could be in the form of a downloadable program that borrowers can execute on their own computers or information processors.

The third party preferably sends the analyzed search results in a manner and in a form deemed appropriate by the third party and in compliance with the privacy requirements of the various parties providing information contained in the database 406. The search results are preferably, but optionally transmitted via the Internet 410, or distributed as otherwise described above.

As mentioned, the borrower(s) or their representatives can input appropriate information to the database 406 directly via the Internet 410, or with third party transcription assistance through phone, fax, mail, etc. or through other means described above or developed in the future. Preferably the borrower supplied information is reviewed, monitored, analyzed or processed in some manner by the third party or by an entity managing the database 406 in order to ensure the integrity, accuracy and completeness of the information provided by the borrower.

The lender site 402 also preferably has access to consumers through the Internet 410, as shown, or through other means described herein or later developed. The lender site 402 preferably has software allowing borrowers to provide information as in blocks 100 and/or 102. The lender site 402 can transmit that information to the third party site 400 for processing by the third party as described herein. The third party operating the site 400 can be and is preferably independent, but could be part of the same company as the lender 402 transmitting the information, or could have contractual agreements to process information for such lender(s). The computer interconnection and the access to the information on one or more databases as described herein, allows implementation of the various financial transactions described herein.

In a further way to use the this system and process, a borrower can enter various loan criteria that are of importance to the borrower (e.g., monthly payment or closing costs) into the borrower's computer or the third party's processing equipment at site 400, and search for a loan for which the borrower qualifies. That allows the borrower direct access to the analytical and search capabilities of the credit grading module 408, and the database 406. This assumes that borrower information of the type obtained in block 100 and/or 102 has been obtained and is used in the analysis and search. But the borrower's credit grading need not be actually disclosed to the borrower to conduct such searching and analysis. The credit grading could be stored on site 400 or otherwise provided to or determined by module 408 without providing that information to the borrower. This withholding of the credit grading information can inhibit uses from reverse engineering the credit grading algorithm in order to game the system. That assumes that the credit grading algorithm is not publicly known, or is not readily available or is not known to the borrower.

As a further way to use the system and process described herein, after finding a suitable loan through the search engine associated with site 400 (whether the search is done by the borrower or the third party), the borrower could select a loan package and apply for a loan. The information could be transmitted over the Internet 410 or other computer linkages, or as otherwise described herein or developed later. In connection with such loan application, some or all of the information associated with the borrower that is stored in or accessible by site 400, can be transmitted to or accessible by the lender providing the loan package selected by the borrower. This loan package preferably has a guaranteed loan rate (via block 302). The costs associated with the loan are preferably, but optionally also guaranteed, preferably by the lender but possibly by an unrelated party that provides or arranges the various services associated with the closing of the loan transaction.

As shown in FIG. 4, the third party web site 400 and the lender web site 402 may be separate and distinct web sites. However, it will be appreciated that a single web site may be used in which the user interface(web pages) displayed and available functions depend on whether the user is a borrower or a lender.

Although Internet web sites are shown, other types of interactive systems and user associated interfaces could be used. For example, borrowers and lenders could access the system via an online services network (America Online, Microsoft Network, etc), an interactive television system, a touch-tone telephone interface, e-mail, a telephone-based voice recognition system such as "Tellme," or other ways of transmitting information now known or developed in the future.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art. Further, the various features of this invention can be used alone, or in varying combinations with each other and are not intended to be limited to the specific combination described herein.

What is claimed is:

1. A computer-implemented system for enabling borrowers to anonymously shop for loan packages offered by a plurality of lenders, the system comprising:
a database that stores loan package data specifying loan packages for home loans offered by the lenders, the loan package data specifying, for each of the loan packages, at least a loan type, an interest rate, and a required borrower credit grading; and
a computer system that provides:
a first interface that allows the lenders to securely upload at least some of the loan package data for their respective loan packages to the database over a computer network; and
a second interface that prompts a borrower to enter personal loan evaluation information, and invokes, on a computer, a borrower grading module which uses at least the entered personal loan evaluation information to calculate a credit grading for the borrower, said credit grading being distinct from a credit score of the borrower, and being based on underwriting criteria used by at least some of said lenders;
wherein the second interface provides functionality for the borrower to search the database to identify a set of loan packages for which the borrower qualifies based on the credit grading, and to compare the loan packages within the set, including loan type and interest rate, while remaining anonymous to each of the lenders and without having to post a request to any of the lenders, said second interface configured to display to the borrower an indication of a total cost of each loan package in the set, said total cost including costs of closing services not provided by corresponding lenders;
and wherein the computer-implemented system further enables the borrower to selectively expose at least the personal loan evaluation information to a lender corresponding to a selected loan package.

2. The system of claim 1, wherein the second interface comprises a set of web pages of a web site.

3. The system of claim 1, wherein the computer-implemented system is operated by a third party evaluator that is independent of said lenders, and the borrower grading module comprises software confidentially provided to the third party evaluator by at least one of the lenders, said software allowing for automated application of the underwriting criteria.

4. The system of claim 1, wherein the loan package data specifies an interest rate and all fees for at least one guaranteed-cost loan package.

5. The system of claim 1, wherein the loan package data for at least some of the loan packages includes guaranteed closing costs.

6. The system of claim 1, wherein the second interface displays information about the loan packages in a spread sheet format.

7. The system of claim 6, wherein the information about the loan packages comprises loan term, loan rate, loan conditions and loan closing costs.

8. The system of claim 1, wherein the borrower grading module calculates the credit grading, at least in-part, using at least one lender-specific loan evaluation system of a particular lender.

9. The system of claim 1, wherein the borrower grading module calculates the credit grading based in part on a borrower credit rating obtained from a credit bureau.

10. The system of claim 1, wherein the borrower grading module calculates the credit grading based on objective criteria used by a plurality of lenders.

11. The system of claim 1, wherein the computer-implemented system outputs the credit grading to the borrower.

12. The system of claim 1, wherein the second interface presents to the borrower closing cost information for a loan, said closing cost information compiled by a third party that does not provide the loan.

13. The system of claim 1, wherein the second interface additionally provides functionality for the borrower to apply for a selected loan.

14. The system of claim 1, wherein the borrower grading module generates the credit grading using a non-lender-specific credit rating algorithm that is accepted by each of said plurality of lenders.

15. The system of claim 1, wherein some of the loan package data stored in the database and displayed via the second interface is provided by a third party that is not one of said lenders.

16. The system of claim 1, wherein the computer-implemented system is capable of pre-approving the borrower for the selected loan package on behalf of the lender without exposing any information about the borrower to the lender.

17. The system of claim 1, wherein the computer-implemented system is capable of fully approving the borrower for the selected loan package on behalf of the lender.

18. The system of claim 1, wherein the computer-implemented system reveals to the borrower monetary amounts the lenders are paying for the funds associated with the loan packages, such that the borrower can take said amounts into consideration in selecting a loan package.

19. A computer-implemented method, comprising:
receiving, over a computer network, personal data entered by a borrower, said personal data comprising loan evaluation data;
automatically generating or causing the generation of a credit grading for the borrower such that the credit grading is dependent upon the loan evaluation data entered by the borrower, said credit grading being distinct from a credit score obtained from a credit bureau, and being generated at least partly using underwriting criteria of one or more lenders;
identifying a set of loan packages for which the borrower qualifies based on said credit grading, each loan package including home loan information provided by a lender, and including guaranteed closing cost information for closing services not provided by the lender, wherein the set of loan packages is identified without requiring the borrower to post a request to any lender;

outputting information regarding the set of loan packages, including the guaranteed closing cost information for closing services not provided by the lender, to the borrower via a user interface that enables the borrower to at least compare total costs of the loan packages for which the borrower qualifies, said user interface additionally providing functionality for the user to select and apply for one of said loan packages; and in response to a request from the borrower in association with a selected loan package, communicating information of the borrower to a corresponding lender.

20. The method of claim 19, wherein the method further comprises outputting to the borrower an indication of an amount a lender is paying for funds associated with at least one of the loan packages.

21. The method of claim 19, wherein the credit grading is generated using a non-lender-specific grading algorithm.

22. The method of claim 19, wherein the method is performed by a computer system operated by a third party evaluator that is independent of said lenders, and the method comprises automatically applying the underwriting criteria, at least in part, by executing software confidentially provided to the third party evaluator by at least one of said lenders.

23. The method of claim 19, further comprising pre-approving the borrower for the selected loan package on behalf of the lender without exposing any information of the borrower to the lender.

24. The method of claim 19, further comprising approving the borrower for the selected loan package on behalf of the lender.

25. The system of claim 1, wherein the computer-implemented system communicates the personal loan evaluation information to the lender in association with an anonymous identifier of the borrower.

26. The system of claim 1, wherein the computer-implemented system is configured to communicate credit information of the borrower to said lender while concealing the identity of the borrower.

27. The system of claim 1, wherein the computer-implemented system additionally enables the borrower to obtain a pre-approval from the lender for the selected loan package while remaining anonymous to the lender, said pre-approval including guaranteed loan terms for the selected loan package.

28. The system of claim 27, wherein the selected loan package is a mortgage-based home loan, and the pre-approval additionally includes guaranteed closing costs for the selected loan package.

29. The system of claim 1, wherein the computer-implemented system is further capable of interacting with said lender to enable the borrower to anonymously obtain approval for the selected loan package.

30. The system of claim 1, wherein the computer-implemented system additionally provides functionality for the borrower to select one or more third party vendors to provide closing services associated with the selected loan package.

31. A computerized method of reducing discriminatory lending, comprising:

obtaining personal and financial information of a borrower seeking a home loan;

generating a credit grading for the borrower, at least in part, via execution of software that automatically applies underwriting criteria of at least one lender to the financial information of the borrower, wherein the credit grading is generated without exposing any of said financial information of the borrower to any lender;

using at least the credit grading to identify a plurality of home loans for which the borrower qualifies, including home loans offered by multiple different lenders, without exposing any information of the borrower to any lender;

outputting information to the borrower regarding the plurality of home loans, said information including interest rates and total costs of said home loans, said total costs including costs of closing services not provided by the corresponding lenders; and approving the borrower for a selected home loan of said plurality of home loans while the borrower remains anonymous to the lender offering the selected home loan;

wherein the method inhibits discriminatory lending by enabling the borrower to obtain approval for the selected home loan while remaining anonymous to the lender.

32. The method of claim 31, wherein the step of approving the borrower comprises guaranteeing a total cost of the loan, including closing costs.

33. The method of claim 31, wherein the step of approving the borrower comprises exposing the financial information of the borrower to the lender while concealing the identity of the borrower.

34. The method of claim 31, wherein the step of outputting information to the borrower comprises offering guaranteed closing costs to the borrower in connection with particular home loans.

35. The method of claim 31, wherein the method is performed by a third party evaluator entity that is not one of said lenders.

36. The method of claim 35, wherein the step of generating the credit grading is performed via execution of software confidentially provided to the third party evaluated by at least one of said lenders.

37. The system of claim 1, wherein the computer system is a distributed system.

* * * * *